US009439441B1

(12) United States Patent
Rodrigues

(10) Patent No.: US 9,439,441 B1
(45) Date of Patent: Sep. 13, 2016

(54) HIGH-VISCOSITY DOUGH DEPOSITOR MACHINE

(71) Applicant: Dale Rodrigues, Paradise, CA (US)

(72) Inventor: Dale Rodrigues, Paradise, CA (US)

(73) Assignee: Mary's Gone Crackers, Inc., Gridley, CA (US)

( * ) Notice: Subject to any disclaimer, the term of this patent is extended or adjusted under 35 U.S.C. 154(b) by 0 days.

(21) Appl. No.: 14/574,808

(22) Filed: Dec. 18, 2014

Related U.S. Application Data

(63) Continuation of application No. 13/360,401, filed on Jan. 27, 2012, now Pat. No. 8,926,307.

(60) Provisional application No. 61/436,886, filed on Jan. 27, 2011.

(51) Int. Cl.
| | |
|---|---|
| *A21C 11/16* | (2006.01) |
| *A21C 11/10* | (2006.01) |
| *A21C 5/08* | (2006.01) |
| *A21C 5/00* | (2006.01) |
| *A21C 9/08* | (2006.01) |
| *A21C 3/04* | (2006.01) |

(Continued)

(52) U.S. Cl.
CPC .............. *A21C 11/10* (2013.01); *A21C 5/08* (2013.01); *A21C 1/145* (2013.01); *A21C 1/1455* (2013.01); *A21C 3/04* (2013.01); *A21C 3/10* (2013.01); *A21C 5/00* (2013.01); *A21C 5/006* (2013.01); *A21C 9/08* (2013.01)

(58) Field of Classification Search
CPC .......... A21C 3/02; A21C 3/021; A21C 3/04; A21C 3/10; A21C 11/10; A21C 11/16; A21C 5/00; A21C 9/08; A21C 1/08; A21C 1/145; A21C 1/1455; A21C 5/08; A21C 5/006

USPC ............ 426/496, 503, 516, 518, 519; 425/382.3, 142, 145, 202, 239, 256, 425/257, 307, 309, 311, 464
See application file for complete search history.

(56) References Cited

U.S. PATENT DOCUMENTS

| | | |
|---|---|---|
| 1,906,160 A | 4/1933 | Kremmling |
| 1,932,345 A | 10/1933 | Kremmling |
| 2,250,128 A | 7/1941 | Jeschke |

(Continued)

OTHER PUBLICATIONS

Polin Probake, Inc., Multi-Drop—Drop Machine for Biscuits, retrieved at http://www.probake.com/docs/Multi-Drop-Creative.pdf on Jan. 27, 2012, 16 pages.

*Primary Examiner* — Seyed Masoud Malekzadeh
(74) *Attorney, Agent, or Firm* — Marsh Fischmann & Breyfogle LLP

(57) ABSTRACT

A dough depositing machine adapted for use in the manufacture of non-traditional baked goods and methods related thereto. Non-traditional dough (e.g., gluten-free, wheat-free, dairy-free, egg-free, vegetarian, or vegan dough) may have properties that are more difficult to accommodate during manufacturing than the properties of traditional dough. Accordingly, various components of the dough depositing machine may be adapted to operate with non-traditional dough. For example, at least one of a dough delivery mechanism, a forming portion, a cutting assembly and a controller of the dough depositing machine may be adapted for use with non-traditional dough. These components of a dough depositing mechanism may be provided as originally manufactured equipment or may be retrofit to an existing dough depositing machine designed for use with traditional dough.

7 Claims, 13 Drawing Sheets

(51) Int. Cl.
*A21C 1/14* (2006.01)
*A21C 3/10* (2006.01)

(56) References Cited

U.S. PATENT DOCUMENTS

| | | | |
|---|---|---|---|
| 2,488,046 A | 11/1949 | Frank et al. | |
| 2,838,012 A * | 6/1958 | Weidenmiller | A21C 11/16 425/311 |
| 3,764,113 A | 10/1973 | Weidenmiller | |
| 3,789,750 A | 2/1974 | Beck et al. | |
| 3,883,283 A | 5/1975 | Herrera | |
| 4,212,609 A | 7/1980 | Fay | |
| 4,445,835 A | 5/1984 | Wasserbach | |
| 4,494,920 A | 1/1985 | Anderson | |
| 4,573,898 A | 3/1986 | Jones et al. | |
| 4,685,878 A | 8/1987 | Pinto | |
| 4,776,785 A | 10/1988 | Jones et al. | |
| 4,778,365 A * | 10/1988 | Archer | A21C 9/04 425/101 |
| 4,786,517 A | 11/1988 | Pinto | |
| 4,813,860 A | 3/1989 | Jonsson et al. | |
| 4,965,435 A | 10/1990 | Smith et al. | |
| 5,077,074 A | 12/1991 | Van Lengerich | |
| 5,110,227 A | 5/1992 | Hatakeyama | |
| 5,112,208 A * | 5/1992 | Voth | A21C 3/02 264/175 |
| 5,123,830 A | 6/1992 | Papalexis | |
| 5,225,209 A | 7/1993 | Hayashi | |
| 5,232,713 A | 8/1993 | Morikawa et al. | |
| 5,266,341 A | 11/1993 | Morikawa et al. | |
| 5,297,947 A | 3/1994 | Cardinali | |
| 5,314,322 A | 5/1994 | Morikawa et al. | |
| 5,576,041 A | 11/1996 | Clow et al. | |
| 5,720,987 A * | 2/1998 | Ploog | A21C 11/163 425/131.1 |
| 5,811,137 A | 9/1998 | Clark et al. | |
| 6,045,840 A * | 4/2000 | Morikawa | A21C 3/04 425/135 |
| 6,082,988 A | 7/2000 | Muller et al. | |
| 6,117,472 A | 9/2000 | Yonemaru et al. | |
| 6,126,431 A | 10/2000 | Hayashi | |
| 6,139,178 A | 10/2000 | Whysall | |
| 6,155,814 A | 12/2000 | Hayashi | |
| 6,387,421 B1 | 5/2002 | Clanton et al. | |
| 7,067,167 B2 | 6/2006 | Damsgard et al. | |
| 7,887,314 B2 | 2/2011 | Ruhe et al. | |
| 8,347,480 B2 | 1/2013 | Ruhe et al. | |
| 8,431,172 B2 | 4/2013 | Vangeepuram et al. | |
| 2006/0222749 A1 | 10/2006 | Ruhe et al. | |
| 2008/0105705 A1 | 5/2008 | Schmidt | |
| 2009/0321473 A1 | 12/2009 | Schmidt | |
| 2010/0028516 A1 | 2/2010 | Vangeepuram et al. | |
| 2010/0083848 A1 | 4/2010 | Ent | |

* cited by examiner

HIGH-VISCOSITY DOUGH DEPOSITOR MACHINE

CROSS-REFERENCE TO RELATED APPLICATION

This application is a continuation of U.S. application Ser. No. 13/360,401 entitled "High-Viscosity Dough Depositor Machine," filed on Jan. 27, 2012, now issued as U.S. Pat. No. 8,926,307, which claims priority to U.S. Provisional Application No. 61/436,886, entitled, "High-Viscosity Dough Depositor Machine," filed on Jan. 27, 2010, the contents of which are incorporated by reference herein as if set forth in full.

FIELD

The present disclosure is generally related to systems and methods related to baking equipment and in particular to systems and methods related to baking equipment adapted for processing non-traditional dough.

BACKGROUND

With the recent emergence of many important specialized product niches in the food marketplace, and the development of many non-traditional flour substances, commercial baking is going through a sea change revolution.

In particular, the growth segments in the baking industry now involve the creation of healthful products that are "gluten-free," "dairy-free," "egg-free," "vegan," and "allergy-friendly." The development of such products (referred to herein individually and collectively as "non-traditional") often requires new approaches to both product formulation and product manufacture, most notably the elimination of traditional baking ingredients such as wheat, barley, rye, butter, eggs, and/or other dairy and animal products. As these basic ingredients are central to the baking tradition, it may be more difficult to produce baked goods, such as cookies, crackers, pretzels, and the like, without using traditional ingredients like gluten or dairy products such as milk, butter, and eggs, which may provide texture and cohesion to dough. Yet many consumers (e.g., for health reasons) may need to eliminate gluten, dairy, animal products, and other substances that occur in traditional food offerings, but that cause allergic reactions or offend modern ethical sensibilities. In particular, gluten may produce an allergic or an autoimmune reaction, commonly referred to as Celiac Disease, among an increasing number of individuals, giving cause to their need for "gluten-free" baked goods.

To meet the needs of these important emerging markets, food companies are developing and manufacturing complex new non-traditional dough or batters with properties that are substantially different from traditional mixtures. However, long-standing baking knowledge and manufacturing technology is based almost entirely on the gluten properties of traditional, wheat-based products. Non-traditional flour substances, such as brown rice flour, quinoa, nut flours, and dried vegetable flours, may not be suited to traditional systems and methods of manufacture, thus requiring new manufacturing processes for the substantially different non-traditional products. In particular, conventional dough depositor production equipment is often inadequate to deal with the increasingly complex and difficult to manufacture dough that is created for non-traditional products. Uncommon product ingredients may result in tacky, tough, and inflexible dough which requires a different manufacture.

For instance, the cookie making properties of traditional cookie dough and non-traditional cookie dough are widely disparate, resulting in a substantially different manufacture. Broadly speaking, traditional gluten levels, such as is found in wheat flour, create lighter dough, with lower density, less stickiness, and an airy texture. Non-traditional cookie dough made without gluten-containing ingredients may be heavier by volume, can be very tacky, dense, or even hard in texture. Thus it may be much harder to process non-traditional dough with machinery designed for traditional dough to get an acceptable through-put.

Also, gluten containing traditional dough may provide less and slower dough spread rates on the cookie sheet because the water in the recipe becomes bound-up with the gluten, resulting in a uniform hydrolization, and an easily handled and formed dough. However, non-traditional dough may be intractable in a dough ball, and may lack the customary stretch of traditional dough. Further still, once non-traditional dough is separated into small pieces, as in cookie baking, the small pieces of dough may spread on a cooking surface because the water in the non-traditional dough is not bound-up with a bonding substance. Therefore, when manufacturing cookies from non-traditional dough dropped onto a pan, the dropped dough must be baked as soon as possible to arrest spread and retain shape. Research suggests that non-traditional dough spreads may be as much as 65% greater than are those of traditional, gluten-containing dough.

Traditional, gluten cookie dough absorbs more water and it does it more quickly, while a non-traditional, gluten-free formulation may take up to 60% longer to absorb water, meaning that in manufacturing, gluten dough can be handled throughout the baking process without substantial loss of water, while non-traditional dough may begin to seep liquid once the dough ball begins to be processed. Gluten also influences the incorporation of air into the respective dough, with traditional gluten dough capturing more air and allowing a fluffier dough. Accordingly, gluten dough may be softer than non-traditional, gluten-free dough. Finally, the degree of stickiness is low in traditional gluten dough, because gluten has been shown to absorb twice its weight in water, while non-traditional dough may absorb only about one-third its weight in water. Thus, non-traditional dough may be more leathery, and hard to work with in manufacturing.

SUMMARY

It has been recognized that based on the foregoing understanding of the difficulties involved in processing non-traditional dough, the need exists for large scale processing of non-traditional dough. As discussed above, the descriptor "non-traditional dough" encompasses dough that can be characterized by any one or more characteristics including gluten-free, dairy-free, egg-free, vegan, vegetarian, and allergy-friendly. In particular it is currently recognized that dough depositing machines as described herein (e.g., in the form of originally manufactured equipment or retrofit traditional dough depositing equipment) may be employed in the processing of non-traditional dough to overcome the foregoing identified difficulties in processing non-traditional dough. As such, the present disclosure describes original equipment dough depositing machines as well as retrofit conventional dough depositing machines particularly suited in the processing of non-traditional dough.

For example, the bearings of a drive assembly for a dough depositing machine may be designed to withstand the greater forces associated with driving higher viscosity non-traditional dough. For example, the bearings may be enlarged in relation to conventional machines, the materials used may be altered, or the bearings may otherwise be engineered to be more robust. Moreover, a bearing housing may be provided that is designed to allow use of different bearings (e.g. depending on the dough composition) and to allow for replacement of worn bearings.

Additionally, a die for shaping the dough may be provided that predominately delivers a desired quantity of dough, and only secondarily to form or shape the dough. In this regard, the cross-sectional area of a dough transfer port of the die provided may be at least about 50% greater than that of conventional dies for the same size baked product. This may allow for improved delivery of the high viscosity non-traditional dough and may result in an acceptable product as the dough will readily spread to the desired product shape.

Additionally, a cutting assembly may be provided including a frame supporting a cutting wire that has been enhanced to withstand the forces associated with cutting non-traditional dough. In this regard, the frame may be constructed from stronger or thicker material or may otherwise be designed to withstand the increased forces associated with non-traditional dough substantially without deformation or failing. In one embodiment, the frame elements at each end of the cutting wire may be doubled (doubled thickness or duplicate frame elements are employed) for enhanced rigidity. The mounting of the frame on a drive shaft operable to actuate the cutting assembly may also be enhanced to accommodate the greater torque transfer associated with non-traditional dough. For example, the drive shaft may be roughed at the mount locations associated to attachment points of the frame to the drive shaft. Moreover, a non-circular (e.g., elliptical or rectangular) drive shaft cross-section may be provided at the mount location, and/or batter, keyways, or other elements may be provided to rotationally lock the frame to the shaft may be utilized.

A cutting wire of a cutting assembly may also be specially adapted for non-traditional dough and for different properties associated with different non-traditional dough compositions. For example, in place of a round cross-section cutting wire, a sharpened wire may be employed. That is, the wire may be elongated cross-section aligned with the direction of cutting travel. The forward edge may be sharpened to a point if desired. Moreover, the frame can be adapted to receive different sizes and/or shapes of cutting wires for different dough compositions.

Different dough compositions may also require changing drive speeds for various components of a dough depositing machine. For a given dough composition and dough transfer port dimension, the thickness of a cut dough piece may be a function of the speed of the dough drive and the speed or frequency of the cutting assembly. In order to accommodate different dough compositions or desired dough piece thicknesses, one or both of the dough drive and the cutting assembly drive may be controlled by a variable speed controller. This allows, for example, for different predefined settings associated with different non-traditional dough compositions.

In light of the foregoing, a first aspect described herein includes a dough depositor for use with non-traditional dough. The depositor includes a hopper for receiving a supply of non-traditional dough, a forming portion for shaping the dough into a predetermined shape, a dough delivery mechanism including at least one roller assembly for driving the dough between the hopper and the forming portion, a cutting assembly for cutting a portion of dough in the predetermined shape, and a controller for controlling the dough depositor. Furthermore, at least one of the hopper, the forming portion, the dough delivery mechanism, the cutting assembly, or the controller is specifically adapted for use with non-conventional dough.

A number of feature refinements and additional features are applicable to the first aspect of the present invention. These feature refinements and additional features may be used individually or in any combination. As such, each of the following features that will be discussed may be, but are not required to be, used with any other feature or combination of features of the first aspect. For example, the non-traditional dough may include at least one of a gluten-free, wheat-free, dairy-free, egg-free, vegetarian, or vegan dough.

Furthermore, in one embodiment, the dough delivery mechanism may include at least one roller assembly for driving the dough between the hopper and the forming portion, and the roller may be mounted by a replaceable bearing insert supported in a separable bearing housing. The bearing insert may comprises a key engageable with a keyway provided on the bearing housing for limiting relative movement between the bearing insert and the bearing housing. A bearing surface provided on the bearing insert may include a bearing surface area not smaller than about 5.5 in$^2$. Alternatively, the bearing surface area may be not smaller than about 5.5 in$^2$, 6 in$^2$, 6.5 in$^2$ or even 7 in$^2$.

In another embodiment, the forming portion may include a die having at least one dough transfer port through which the dough is extrudable to form the dough into the predetermined shape. The dough transfer port may have a cross sectional area not smaller than about 0.75 in$^2$. Alternatively, the dough transfer port may include a cross sectional area not smaller than about 0.8 in$^2$, 0.9 in$^2$, 1 in$^2$, 1.25 in$^2$, or even 1.5 in$^2$. The cross sectional area of the modified dough transfer port may be at least 50% larger than a cross sectional area of a dough transfer port of a conventional dough depositor. The forming portion may include at least one dough transfer port having a diameter of at least about 1 inch (2.5 cm). Further still, the diameter of the dough transfer ports of the forming portion may be not smaller than about 1.25 in, 1.5 in, 1.75 in, or even 2 in. The size of the dough transfer port may be based at least partially on the type of dough being processed.

In yet another embodiment, the cutting assembly may include a frame for supporting a cutting wire. The frame may be mounted to a driveshaft and may include a reinforced mounting structure to resist movement of the frame with respect to the driveshaft. The driveshaft may include a surface treatment that inhibits movement of the frame with respect to the driveshaft. The cutting assembly frame may be operable to receive a variety of cutting wire. As such, a wire having a size and a configuration based on properties of the non-traditional dough may be selected for improved performance with respect to the dough composition.

In still another embodiment, the dough depositor may include a first drive system for controlling the dough delivery system. The controller may be operable to control the first drive system to vary the speed at which the dough delivery system operates. Also, the dough depositor may include a second drive system for controlling the cutting assembly. The controller may be operable to control the speed of the second drive system. In this regard, the controller may be operable to operate the first drive and the second drive independently. Accordingly, the controller may operate the first and second drive at different speeds.

A second aspect described herein includes a method for use in retrofitting a dough depositing machine for processing non-traditional dough. The method includes providing a conventional dough depositing machine having a hopper for receiving a supply of dough, a forming portion for shaping the dough into a predetermined shape, a dough delivery mechanism including at least one roller assembly for driving the dough between the hopper and the forming portion, wherein the at least one roller assembly is mounted by a bearing supported in a bearing housing, a cutting assembly for cutting a portion of dough to separate the portion from the forming portion, and a controller for controlling the dough depositing machine. The method also includes retrofitting at least one of the forming portion, dough delivery mechanism, or the cutting assembly so as to be operable to process non-traditional dough using the modified dough depositing machine.

A number of feature refinements and additional features are applicable to the second aspect of the present invention. These feature refinements and additional features may be used individually or in any combination. As such, each of the following features that will be discussed may be, but are not required to be, used with any other feature or combination of features of the second aspect.

For example, in one embodiment, the retrofitting may include replacing the bearing housing with a separable bearing housing having a first portion and a second portion. The first portion may be selectively separable from the second portion. The separable bearing housing may include replaceable bearing inserts defining bearing surfaces thereon. The replaceable bearing inserts may include a key engageable by a keyway in a portion of the separable bearing housing to secure the bearing insert with respect to the separable bearing housing. The replaceable bearing inserts may include a bearing contact surface of a size described above with respect to the first aspect.

In another embodiment, the forming portion may include a die having at least one dough transfer port through which the dough is extrudable to form the dough into the predetermined shape. The retrofitting may include replacing the die of the conventional dough depositing machine with a modified die including a plurality of modified dough transfer ports having a cross sectional area larger than the dough transfer ports of the conventional dough depositing machine. The modified transfer ports may be sized as described above with respect to the first aspect.

In another embodiment, the retrofitting may include replacing the cutting assembly with a modified cutting assembly capable of withstanding a greater force when actuated to cut the non-traditional dough than that of the cutting assembly of the conventional dough depositing machine. The modified cutting assembly may include a reinforced cutting assembly frame. The cutting assembly may have an enhanced mechanical mount for mounting the frame to a drive shaft, the enhanced mechanical mount operable to withstand a torque acting on the frame associated with cutting the non-traditional dough. The drive shaft may have a surface treatment to assist in withstanding rotational movement of the frame with respect to the drive shaft. Furthermore, the modified cutting assembly may have a wire for cutting through said non-traditional dough. The cutting assembly frame may be adapted for replaceably receiving a plurality of different cutting wires such that a wire size and configuration may be selected based on the non-traditional dough for improved performance with respect to varying dough compositions.

In another embodiment, the dough depositing machine may include a first drive system for controlling the dough delivery mechanism and a second drive system for driving the cutting assembly to separate the dough from the forming portion. The retrofitting may include providing a controller that is operable to control at least one of the first drive system or the second drive system based at least partially on varying dough compositions. The controller may be operable to control the first drive system and the second drive system independently.

A third aspect described herein includes a method for operation of a dough depositor with non-traditional dough. The method includes receiving a supply of non-traditional dough in a hopper and supplying the non-traditional dough to a forming portion by operation of at least one roller supported by a bearing insert supportably positioned with respect to a separable bearing housing. The method also includes forming the dough into a predetermined shape by passing the dough through a dough transfer port sized based at least partially on the properties of the non-traditional dough. The method also includes cutting a portion of the dough in the predetermined shape with a cutting assembly. The cutting includes passing a cutting wire having at least one of a configuration or size selected based at least partially on the properties of the non-traditional dough through the dough. Also, the method includes controlling the speed of at least the supplying and cutting steps based on the properties of the non-traditional dough.

A number of feature refinements and additional features are applicable to the third aspect of the present invention. These feature refinements and additional features may be used individually or in any combination. For example, any of the feature refinements or additional features discussed above with respect to the first or second aspects may be, but are not required to be, used with any other feature or combination of features of the third aspect.

DETAILED DESCRIPTION

Figure 1A:
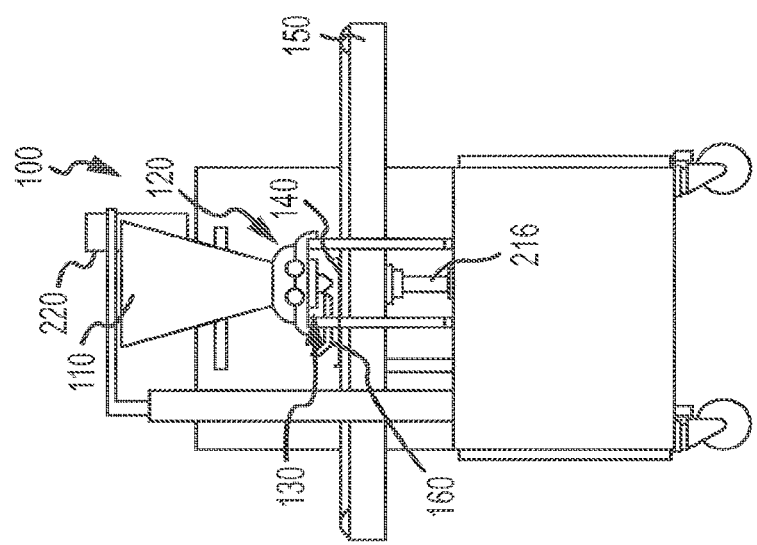
FIGS. 1A and 1B depict front and side elevation views of an embodiment of a dough depositing machine.

The present disclosure details a number of equipment and/or operational modifications, that, when coupled with new approaches to product fabrication, may provide advantages related to dough depositing equipment to manufacture and configure baked goods comprising non-traditional dough.

While many configurations are available for depository equipment, any configuration may be based upon the understanding of certain properties that traditional dough possesses. For example, traditional configurations of dough depositing machines may depend upon certain gluten-bonded moisture content in the dough, the dough being highly pliable, and the dough being easily carried through the machine and into the forming device for each cracker or cookie. Non-traditional dough (i.e., dough that is not made with one or more of wheat flour, dairy products, egg products, other animal products, other potential allergens and/or do not contain gluten, the natural substance that gives conventional dough its cohesion and pliability) present a challenge to such equipment. Accordingly, non-traditional dough products may not pass easily through openings as small as those used to process traditional products. Non-traditional dough binds less water, is less flexible, and is generally denser and tackier than traditional products made with traditional flours and ingredients. Moreover, it may be difficult to train non-traditional dough into novel cookie shapes, even with a die, because the unbound water content of the non-traditional dough may make it tend to flatten out as the free water escapes the dough.

Accordingly, products made from non-traditional dough may be paradoxical to manufacture, in that, on the one hand such dough is highly viscous and difficult to work as it enters the machinery for depositing, but once the dough ball is cut into small cookie size bits, the water in the dough may escape and the deposited cookie may begin to spread unpredictably. In traditional gluten dough manufacturing the spread rate slows with the higher gluten content of any particular dough, such that the deposited cookie may be maintained as it was placed or within predictable, uniform, and/or symmetrical boundaries. The behavior of non-traditional dough is explained in Pareyt, Bram et al, "The Role of Gluten in a Sugar-Snap Cookie System: A Model approach Based on Gluten-Starch Blends," the Journal of Cereal Science, 48 (2008), pp 863-869 (referred to hereinafter as "Pareyt"), which is hereby incorporated by reference in its entirety, in terms of water availability. For example, gluten dough has a higher water-binding capacity than does non-traditional dough. Accordingly, traditional cookie dough flows very slowly, but it may be hard to get gluten-free dough to move, even under the force of gravity, and especially through the shaping dies in cookie making machinery. Also, once deposited on the baking sheet, the uncooked cookies may spread more when they are made with non-traditional dough, thus potentially creating a haphazard cookie for eventual baking That is, portions of the deposited dough may spread more than others, creating non-uniform dough (i.e., dough that is thicker in some spots and thinner in others) that is difficult to bake. Pareyt's research suggests that gluten-free products may spread at about 0.774 cm per minute on a cookie sheet, versus that of traditional dough which may spread at about 0.256 cm per minute. In manufacturing, this may mean that gluten-free dough is messy in the equipment, and while large blocks of dough are hard to manage and form, once the dough is running through the machine, it spreads out in many directions and may lose water content (e.g., water may seep from the dough).

In this regard, non-traditional dough may not be as easily carried by traditional equipment and often requires significant accommodation to be used in the manufacturing process. Non-traditional dough may tend to block, stick, and not easily move along the various portions of traditional dough depositing equipment. This may result in clogging of the machine, thus curtailing the manufacturing process. Also, based on the above-noted properties of non-traditional dough, these dough products also put added stresses and loads on equipment, thus making it more likely to overload, damage, or prematurely wear the equipment. Accordingly, the manufacturing of non-traditional dough may be impossible to carry out using traditional dough depositing equipment, or manufacturing using non-traditional dough may require substantial equipment modification.

The present disclosure generally relates to modifications, process changes, and other improvements to the various portions and/or operation of a dough depositing machine, thus facilitating the use of a dough depositing equipment to process non-traditional dough. Many processes for producing baked goods include a dough depositing machine. These machines deposit dough pieces on a baking sheet in amounts appropriate for the desired product, e.g., cookies, crackers, or the like. Thus, the present disclosure contemplates a depositing machine adapted to process non-traditional dough. This may involve manufacture and/or operation of a depositing machine specifically adapted for use with non-traditional dough or may include retrofitting a conventional dough depositing machine (e.g., a dough depositing machine such as a Polin proBAKE depositor available from proBAKE Inc. of Twinsburg, Ohio) to accommodate the particular properties of non-traditional dough detailed above. Thus, the discussion below may refer to changes made to traditional dough depositing equipment, however, it will be understood similar equipment may be originally manufactured to similar specifications as the retrofit parts for use with non-traditional dough.

Figure 1B:
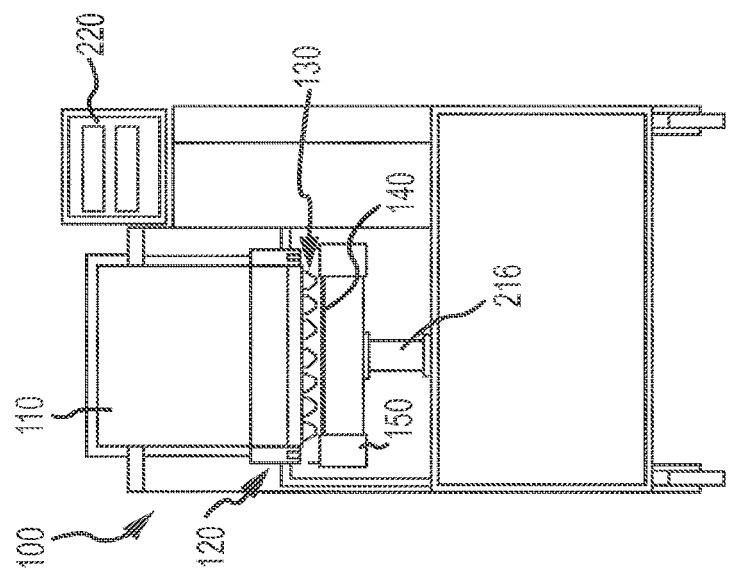
Figure 13:
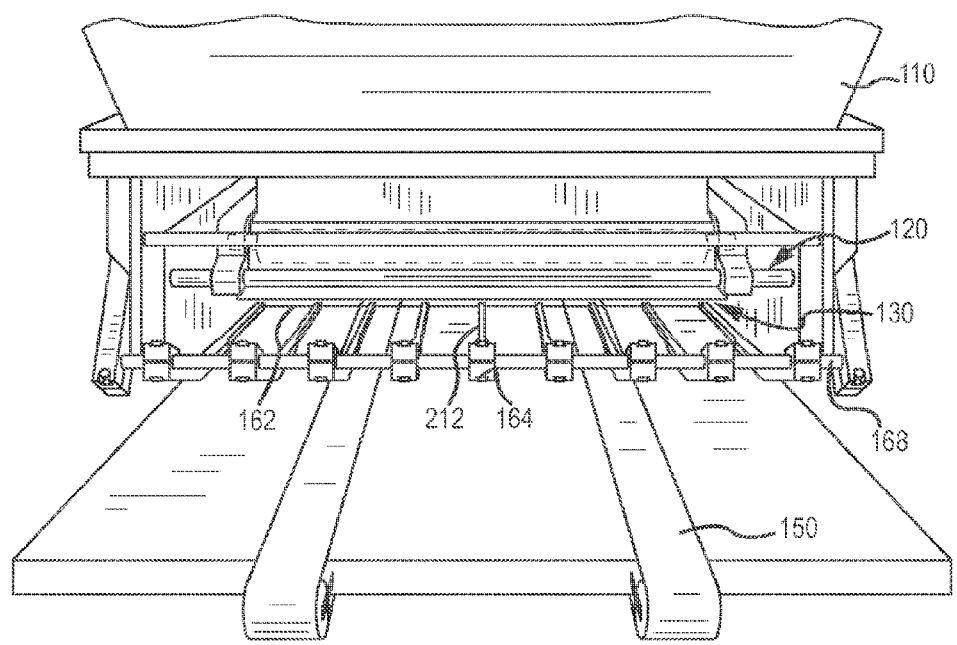
FIG. 13 depicts a perspective view of a rear of an embodiment of a dough depositing machine.
Figure 14:
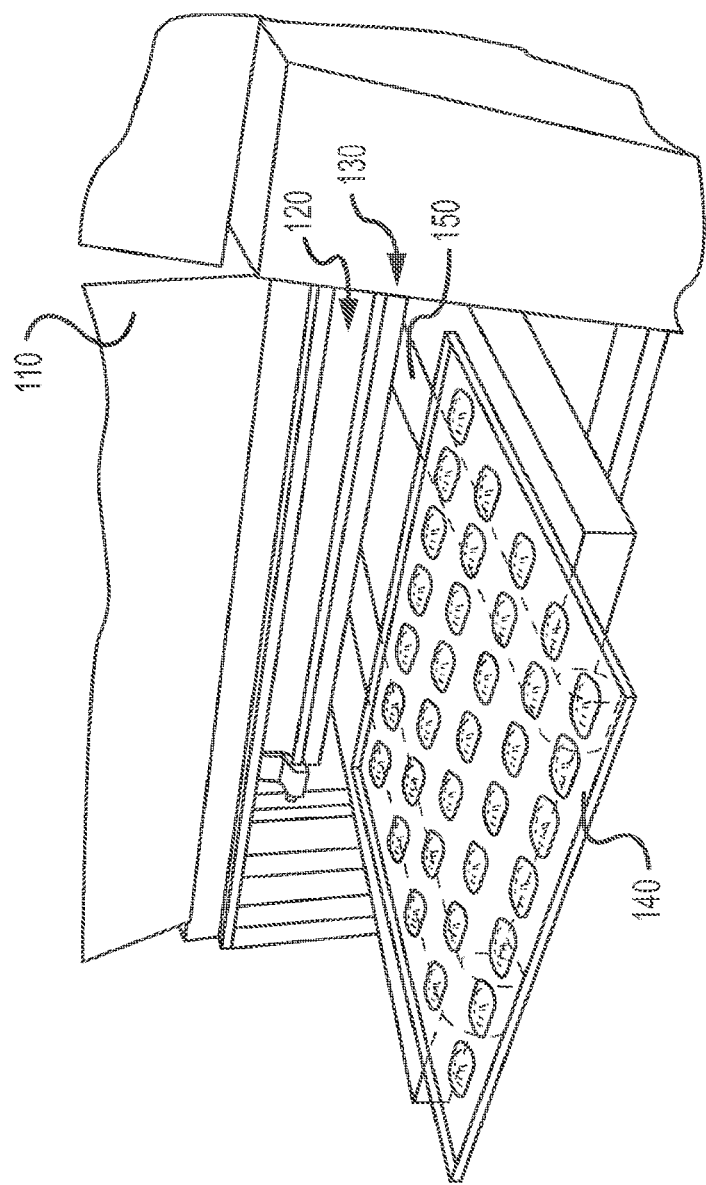
FIG. 14 depicts a perspective view of a front of an embodiment of a dough depositing machine.

One example of a depositing machine 100 that can be used to process non-traditional dough is depicted in FIGS. 1A and 1B. Also, FIG. 13 depicts a perspective view of the rear of the depositing machine 100 and FIG. 14 depicts a perspective view of the front of the dough depositing machine 100. Generally, the depositing machine 100 may include a hopper 110 for receiving a supply of dough. Additionally, a dough delivery mechanism 120 may be provided for advancing the dough from the hopper 110 to a forming portion 130. In turn, dough may be passed through the forming portion 130 to shape the dough into a desired form. A cutting assembly 160 may be provided to separate portions of dough from the forming portion 130. In turn, the dough may drop to a baking sheet 140 that may be advanced with respect to the forming portion 130 by a conveyor 150 passing under the forming portion 130. The conveyor 150 may be disposed on an adjustable height pedestal 216 such that the distance between the forming portion 130 and the conveyor 150 may be adjusted. Thus, once portions of dough have been deposited onto the baking sheet 150, the baking sheet 140 may be advanced by the conveyor 150 so as to continue on in manufacturing process (e.g., to an oven for baking, further processing operations, etc.).

Figure 2:
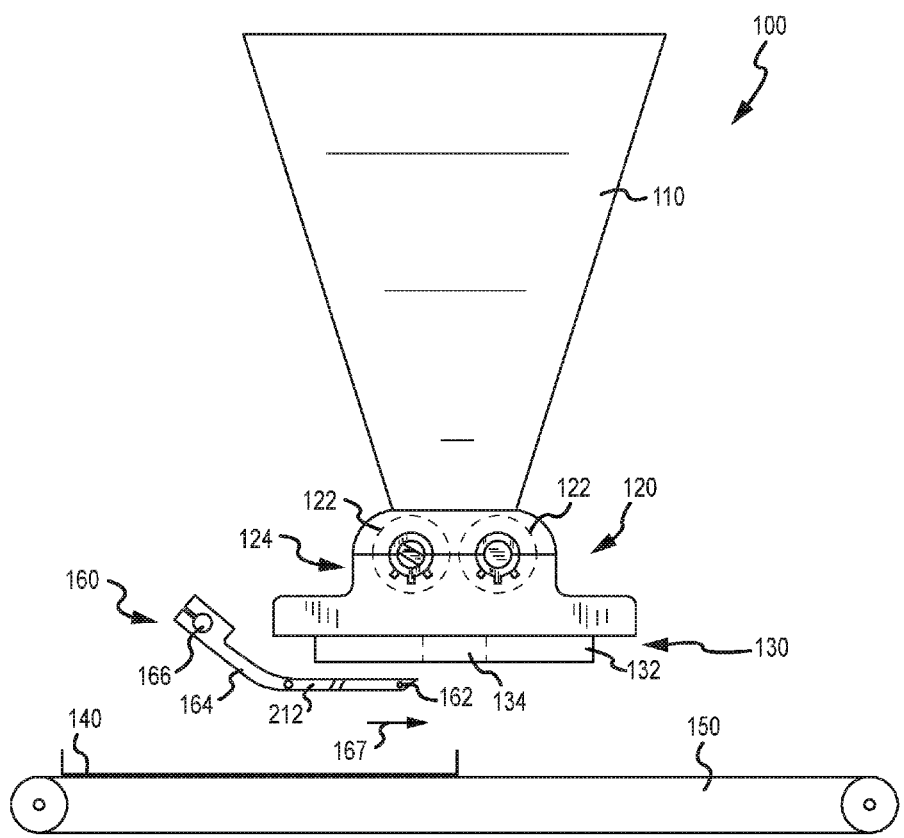
FIG. 2 depicts a schematic detail view of an embodiment of a dough depositing machine.

With additional reference to FIG. 2, a schematic view of a portion of a depositing machine 100 including the hopper 110, dough delivery mechanism 120, forming portion 130, conveyor 150 for transporting a baking sheet 140, and cutting assembly 160 is depicted. The dough delivery mechanism 120 may include one or more rollers 122 comprising a roller system for advancing the dough toward a shaping die 132 of the forming portion 130. The hopper 110 may feed (e.g., by way of gravity), a supply of dough to one or more rollers 122. The rollers 122 may be supported by a bearing assembly 124. The rollers 122 may be fluted or grooved to assist in the gripping of the dough to advance the dough between the rollers. As such, the rollers 122 of the dough delivery mechanism may force dough through the forming portion 130. Specifically, a die 132 including dough transfer ports 134 may be provided through which the dough may be extruded so as to shape the dough into a predetermined shape. Once the dough has been shaped into a predetermined shape (e.g., by way of extrusion through the dough transfer ports 134), portions of dough may be separated from the forming portion 130 by a cutting assembly 160. For example, a cutting assembly may include a cutting wire 162 supported by a frame 164 such that the cutting wire 162 may be passed through the extruded dough in a direction of the arrow 167 depicted in FIG. 2 to cut portions of the preformed dough to be deposited on a baking sheet 150. The frame 164 may be moved with respect to the forming portion 130 through movement or actuation of a drive shaft 166 to force the cutting wire 162 through dough that has been extruded through the dough transfer port 134. The baking sheet may be advanced on a conveyor 150 such that as the dough is separated by the cutting assembly 160, preformed portions of dough are deposited onto the baking sheet 140.

It has been recognized that traditional dough depositors are unsuited for use with non-traditional dough. For example, a number of key areas of dough depositors were identified by the present inventors as unsuited for use with non-traditional dough including the dough delivery mechanism, the forming porting, the cutting assembly, and the machine controller. As such, each of the foregoing aspects of a dough depositor equipment that will be described in greater detail below may be particularly suited for use with non-traditional dough.

For example, in conventional dough machines, the roller shaft of the dough delivery mechanism may be received in a cylindrical bearing mounted in a plate-like bearing housing. These bearings of conventional dough depositor are seldom, if ever, replaced as replacement of these bearings is generally unnecessary when processing conventional dough. Replacement of such bearings may require replacement of the entire housing assembly. However, due to the properties of non-conventional dough described above, the forces imparted on the rollers of the dough deliver mechanism, and in turn the bearings supporting the rollers may be increased over the forces experienced when processing traditional dough.

Figure 3:
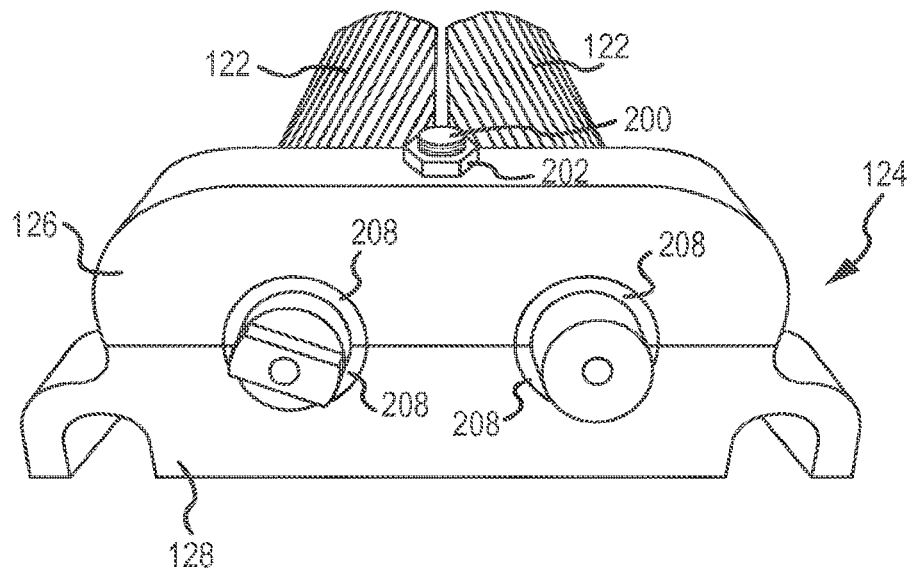
FIG. 3 depicts a perspective view of an embodiment of a bearing assembly.
Figure 4:
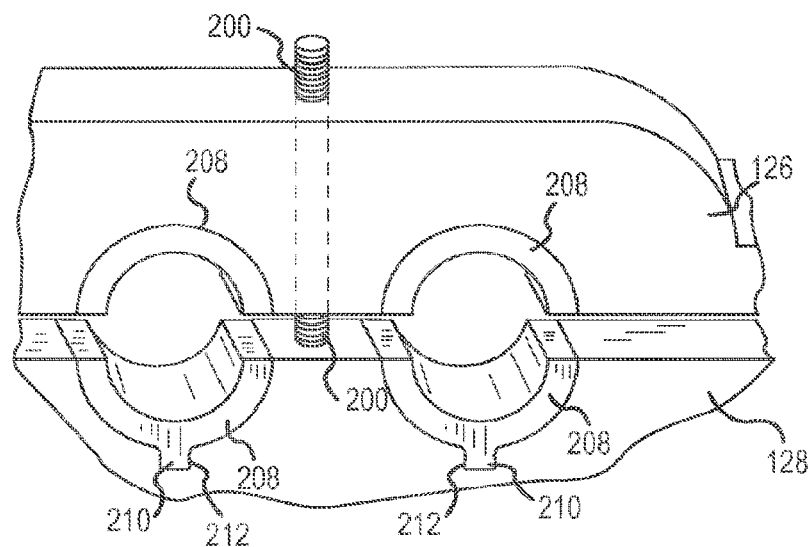
FIG. 4 depicts a partially exploded view of the bearing assembly of FIG. 3.
Figure 5:
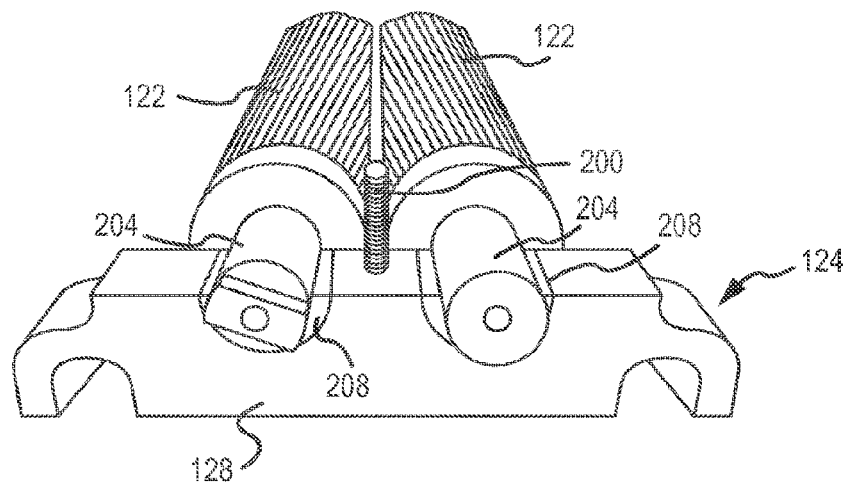
FIG. 5 depicts a disassembled portion of the bearing assembly of FIG. 3.
Figure 6:
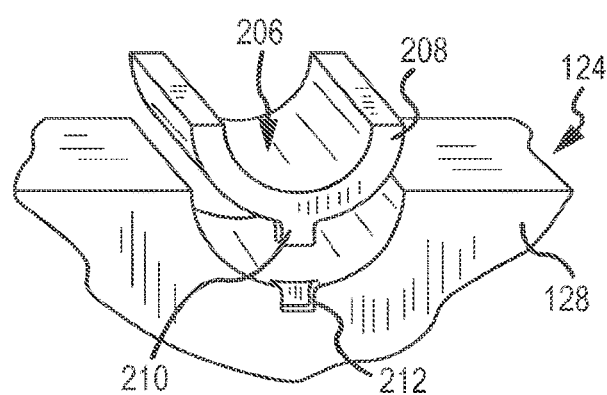
FIG. 6 depicts an embodiment of a bearing insert partially exploded with respect to the bearing assembly of FIG. 3.

Accordingly, a bearing assembly 124 as depicted in FIG. 3 may be provided. The bearing assembly may include a split bearing housing that includes a first portion 126 and a second portion 128 that may be selectively separated. With additional reference to FIGS. 4-6, the second portion 128 of the split bearing housing may include a stud 200 that may pass through the first portion 126 of the split bearing housing when adjacently positioned. As such, when the first portion 126 is disposed in place adjacent to the second portion 128, the stud 200 may receive a fastener 202 to secure the first portion 126 with respect to the second portion 128 of the bearing housing. The fastener 202 may be removed and the portions 126 and 128 of the bearing assembly 124 may be separated as shown in FIG. 4. In turn, the rollers 122 of the dough delivery mechanism 120 may be accessed as shown in FIG. 5.

In the depicted embodiment, the bearing assembly 124 may comprise a pillow-block type bearing. The rollers 122 may include shafts 204 engaged by the bearing assembly 124. The shafts 204 may contact bearing surfaces 206 of the bearing assembly 124. The bearing surfaces 206 may be defined by bearing inserts 208 as shown in the exploded view of FIG. 6. The bearing inserts 208 may be constructed of a material different than the first and second portions 126 and 128 of the bearing assembly 124. For example, bearing inserts 208 may be constructed from bronze, Babbit metal, brass, graphite, a polymer, or any other suitable material that demonstrates desirable properties (e.g., low friction, low wear, etc.). A pair of bearing inserts 208 may be provided corresponding to each one of the respective shafts 204 of the rollers to define coordinating circumferential bearing surfaces 206 that surrounds the shafts 204 in the bearing assembly 124.

Upon separation of the portions 126 and 128 of the bearing assembly 124, the bearing inserts 208 may be accessed. For example, the bearing inserts 208 may be removable from a respective one of the first portion 126 or second portion 128. In turn, the bearing inserts 208 may be replaceable. The split bearing housing 124 may thus facilitate efficient replacement if the bearing surfaces 206 become worn. It will be appreciated that due to the increased loads applied to the rollers 122 by virtue of the above-noted properties of non-traditional dough, the bearing surfaces 206 may wear at an increased rate when processing non-traditional dough. Accordingly, when bearing replacement is needed, the first and second portions 126 and 128 of the bearing housing may be separated as described above and the rollers 122 may be removed. Thus, the bearing inserts 208 may be removed from the bearing assembly 124 and replaced with new bearing inserts 208. The rollers 122 may be replaced and the first and second portions 128 of the bearing housing may be closed and secured (e.g., by fastening the fastener 202 to the stud 200).

Figure 7:
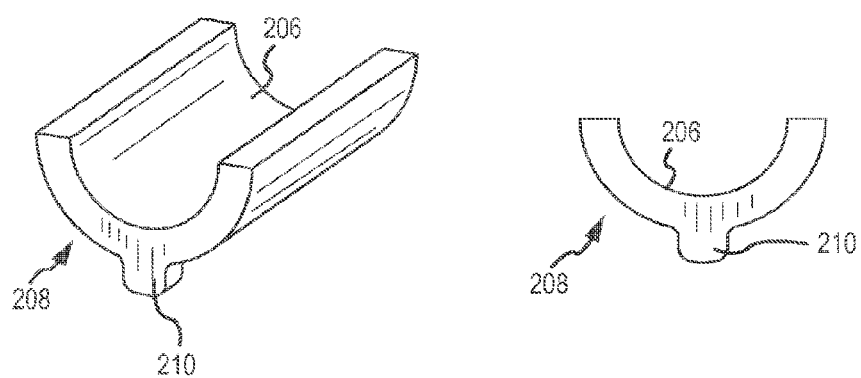
FIG. 7 depicts an embodiment of a bearing insert.

The bearing inserts 208 may include bearing surfaces 206 that are generally larger than traditional bearing surfaces used in conjunction with traditional dough. For example, a bearing insert 208 having a bearing surface 206 is depicted in FIG. 7. The bearing surface 206 may include a larger bearing surface area than would normally be provided in a traditional dough depositing machine to assist with the increased loading experienced when processing non-traditional dough. For example, the bearing surface area of the bearing surface 206 may be not smaller than about 5 in$^2$. Alternatively, the bearing surface area of the bearing surface 206 may be not smaller than about 5.5 in$^2$, 6 in$^2$, 6.5 in$^2$ or even 7 in$^2$. The larger bearing surface 206 may prevent the rollers 122 from moving (e.g., wobbling) with respect to the bearing housing 124 under the added force applied to the rollers 122 when processing non-traditional dough. The wobbling or movement of the rollers 122 could prematurely wear the bearings and result in the machine operating out of tolerance (e.g., with respect to the spacing between rollers 122, etc.). Thus, the larger bearing surface 206 may help prevent undesired movement of the rollers 122 when processing non-traditional dough.

Additionally, the bearing insert 208 may include a retention structure to assist in preventing the bearing insert 208 from moving with respect to the bearing housing 124. In the illustrated embodiment, at least one of the bearing inserts 208 may includes a radial protrusion, or key 210, that is received in a mating keyway 212 formed in the bearing housing 124. In this manner the bearing insert 208 may be prevented from moving (e.g., especially from rotating) with respect to the bearing housing 124. Accordingly, the bearing assembly 120 may remain stationary in the bearing housing 124 and withstand high torques applied to the rollers 122 and in turn the shafts 204 that are associated with dense, high viscosity dough.

In other various embodiments, different rollers and/or bearing types may be provided for different dough compositions. For example, alternative types of bearings (e.g., roller bearings, needle bearings, taper bearings, etc.) may be provided without limitation. Also, while the separable first and second portions 126 and 128 of the bearing assembly 124 are described above as being secured by way of a fastener 202 tightened on a threaded stud 200, other methods of selectively securing the two portions of the bearing assembly may also be provided without limitation. For example, alternative forms of fasteners (e.g., bolts securing one portion to another, clasps, straps, or other means of selectively securing the portions of the bearing assembly) may be provided.

Once the dough passes through the dough delivery mechanism 122, the dough is passed through the forming portion 130 to shape the dough into a desired shape. With reference to FIG. 2, the forming portion 130 includes a die 132 positioned downstream of the dough delivery mechanism 120. The die 132 includes a number of dough transfer ports 134 having a shape corresponding to the desired shape of the dough. Dough may be forced through the dough transfer ports 134 by action of the dough delivery mechanism 120 on the dough.

The forming portion 120 of the dough depositing machine 100 may also be adapted to be used with non-traditional dough. It has been recognized that processing thicker and denser non-traditional dough may require a modified forming portion 120. For example, modified dies 132 may be provided. The modified die 132 may be intended less to shape the dough than to deliver the right amount of dough to the wire cutting device 160.

Figure 8A:
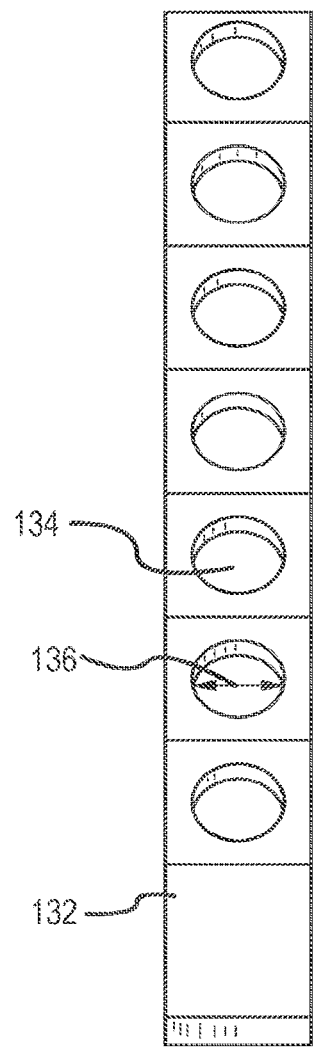
FIGS. 8A and 8B depict an embodiment of a modified die for use in a dough depositing machine and a conventional die, respectively.
Figure 8B:
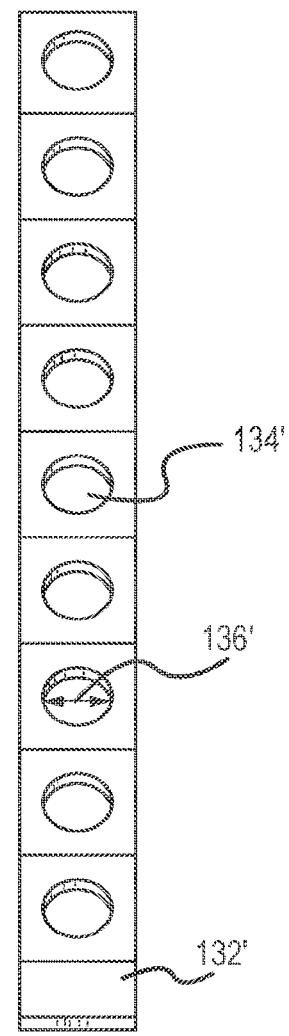

With additional reference to FIGS. 8A and 8B, a modified die 132 is shown in FIG. 8A and a traditional die 132' is depicted in FIG. 8B. Generally speaking, the modified die 132' may be more robust, comprising a physically larger die 132 (e.g., a thicker, wider, and/or longer die) and/or a die 132 constructed from more durable materials. Furthermore, as can clearly be appreciated from FIGS. 8A and 8B, the modified die 132 may include larger dough transfer ports 134 than the dough transfer ports 134' of the traditional die 132'. That is, the cross sectional area of the dough transfer ports 134 of the modified die 132 may be larger than the cross sectional area of a dough transfer ports 134' of the conventional forming die 132'. In one embodiment, the cross sectional area of the modified dough transfer ports 134 may be at least about 10%, 20%, 25%, 30%, 40%, or even 50% larger than the cross sectional area of the conventional dough transfer ports 134'. For example, the cross sectional area of the modified dough transfer ports 134 may be not less than about 0.75 in$^2$, 0.8 in$^2$, 0.9 in$^2$, 1 in$^2$, 1.25 in$^2$, or even 1.5 in$^2$. Additionally, a diameter 136 of the dough transfer ports 134 of the modified die 132 may be at least about 1 inch (2.5 cm). Alternatively, the diameter 136 of the dough transfer ports 134 may be not smaller than about 1.25 in, 1.5 in, 1.75 in, or even 2 in. For example, in manufacturing a ginger snap cookie may be delivered through the system to the cookie sheet through a 1.5 in dough transfer port, while a chocolate chip cookie may be extruded through a 1.375 in dough transfer port.

Figure 9:
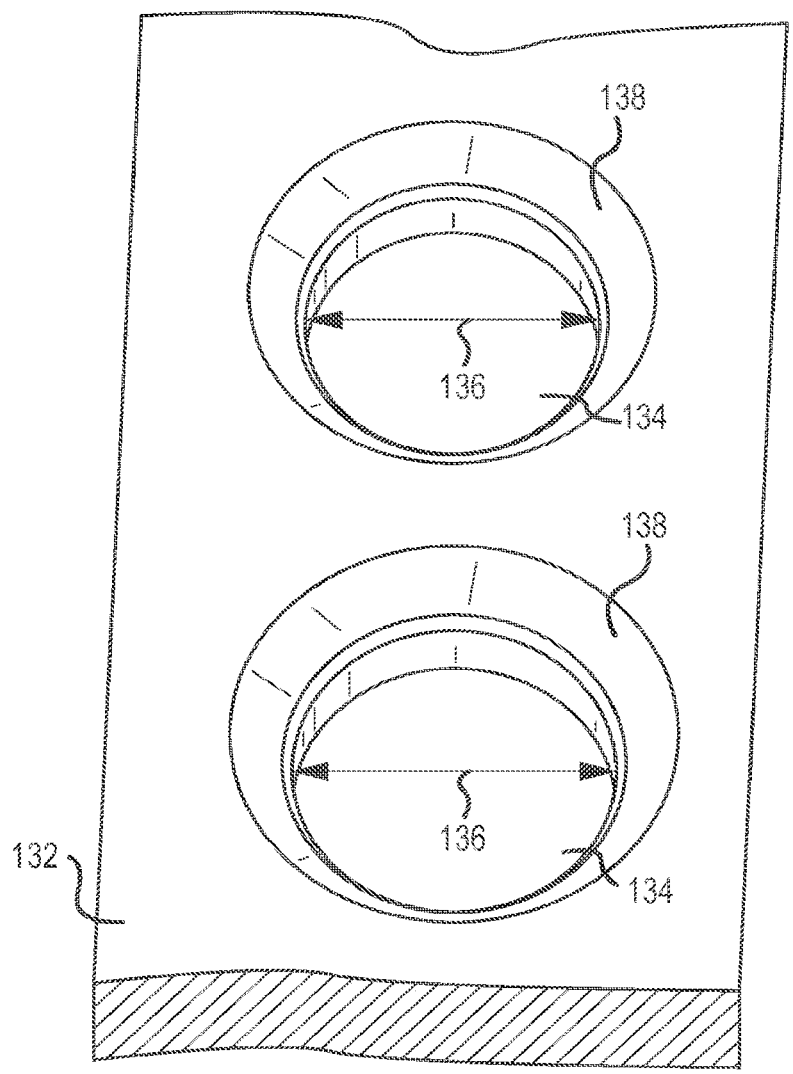
FIG. 9 depicts an embodiment of a dough transfer port.

With additional reference to FIG. 9, the dough transfer ports 134 may be adapted to transport the requisite volume of dough through the forming portion. In this regard, the dies 132 may have features that focus the subsequent extrusion. As can be appreciated, a chamfered edge 138 may be provided to assist in the forming of the dough into a desired shape. The chamfered edge 138 may face the dough delivery mechanism such that as the dough is delivered to the forming portion 120, the dough contacts the chamfered edge 138 and is directed through the dough transfer port 134.

The dough depositing machine may also include a cutting assembly 160 for cutting the dough into pieces that are then deposited on baking sheets 150. The cutting assembly may be positioned with respect to the forming portion 130 as shown in FIG. 2. The cutting assembly 160 may include a cutting wire 162 that is mounted on a frame 164. The frame, in turn, may be mounted on a drive shaft 168 such that rotation and/or translation of the drive shaft 168 forces the wire 162 through the dough extruded through the die 132 so as to form the dough pieces. In conventional dough depositing machines, often times a thin, round wire is employed to cut the portions of dough. However, it has been found that attempts to manufacture non-traditional dough demonstrate that conventional wire cutter assemblies are entirely inadequate to cut non-traditional dough.

Figure 10A:
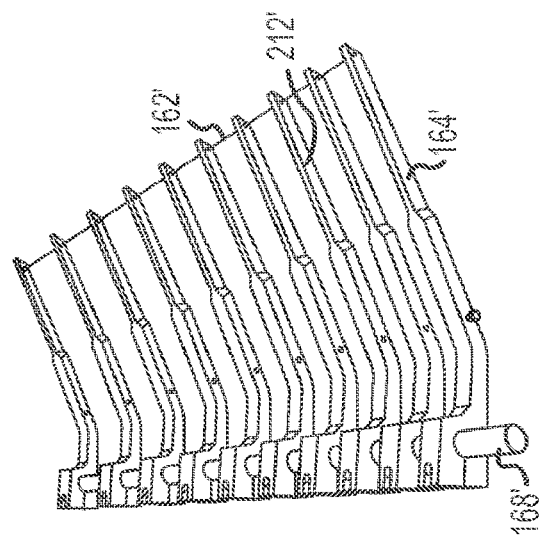
FIGS. 10A and 10B depict an embodiment of a modified cutting assembly and a conventional die, respectively.
Figure 10B:
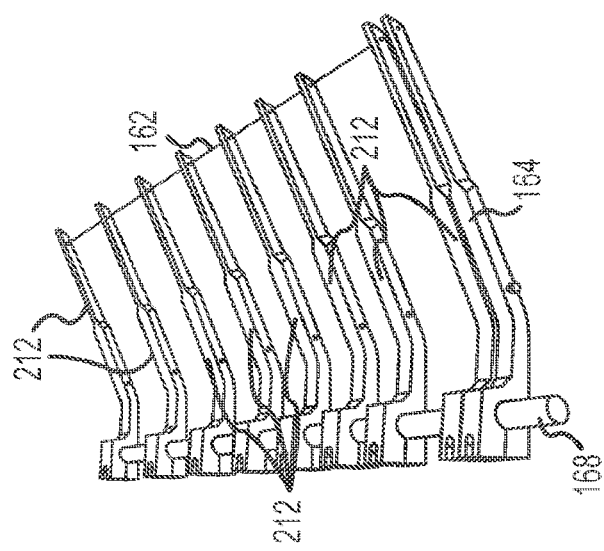
Figure 12:
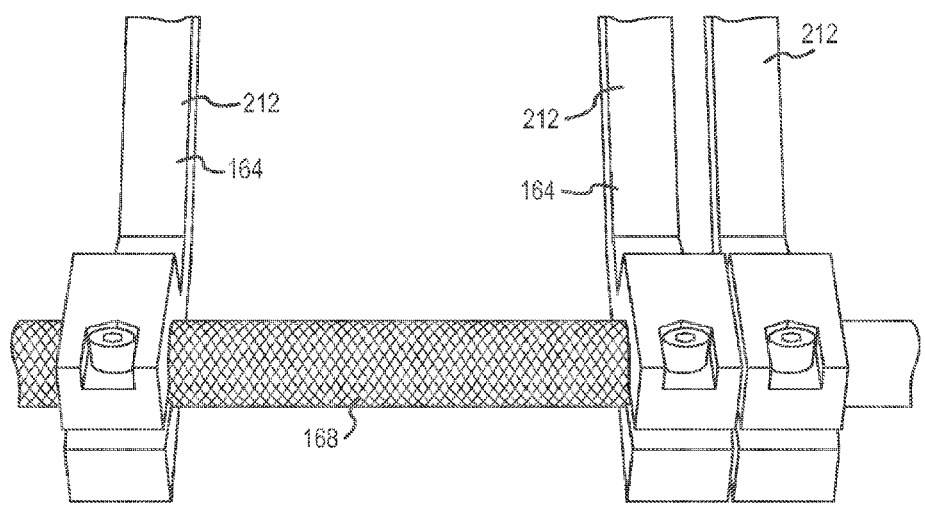
FIG. 12 depicts a detail view of an embodiment of a drive shaft of a cutting assembly.

Accordingly, a modified cutting assembly frame 164 may be provided. As depicted in FIGS. 10A and 10B, a modified cutting assembly frame 164 is shown with respect to a conventional cutting assembly frame 164'. Generally speaking, the spacing of wire carrier fingers 212 of the cutting assembly frame 164 may be provided that corresponds to the dough transfer ports 134 of the modified die 132. That is, the spacing of the wire carrier fingers 212 are generally disposed between adjacent dough transfer ports 134 such that the cutting wire 162 spans the entire width of the dough transfer port 134. In this regard, as the cutting assembly 160 is moved with respect to the forming portion 130, the dough may be severed such that it may fall into the baking sheet 150. In that the dough transfer ports 134 may generally be larger when used with non-traditional dough, the spacing of the wire carrier fingers 212 may also generally be more spaced apart than in conventional dough depositing machines. Reinforced wire carrier fingers 212 may be provided to withstand the increased forces experienced when attempting to process non-traditional dough. Furthermore, the drive shaft 168 to which the wire carrier fingers 212 are attached may include a surface treatment (e.g., be roughed, knurled, or otherwise treated) to prevent slippage of the wire carrier fingers 212 upon actuation of the cutting frame assembly 160 as shown in FIG. 12.

Figure 11A:
FIGS. 11A and 11B depict cross-sections of embodiments of cutting wires that may be used in a cutting assembly.
Figure 11B:
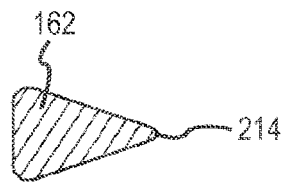

Further still, the shape and size of the cutting wire 162 may be specifically adapted for use with non-traditional dough. For example, rather than a traditional round, thin cutting wire 162' as shown in FIG. 11A, a somewhat sharpened cutting wire 162 as shown in FIG. 11B may be provided such that a sharpened leading edge 214 may be advanced through the dough. The sharpened leading edge 214 may assist in cutting through the generally tougher, non-traditional dough. Also, the wire 162 may be generally thicker than that of the conventional cutting wire 162'. Thus, the thicker, sharp cutting wire 162 may separate the dough more completely while reducing the amount of force transferred onto the frame 164.

Additionally, the dough depositing machine described herein may include a controller 220 for controlling the operation of the machine 100. For example, the controller 220 may be operable to control the speed and/or timing of the operation of the dough depositing machine. In embodiment, the dough delivery mechanism 120 and/or the cutting assembly 160 may be controlled (e.g., individually or in cooperation) by the controller 220 such that the speed of the dough delivery mechanism 120 and/or cutting assembly 160 may be controlled. In this regard, a frequency inverter apparatus 300 may be provided so that the speed of the cutting assembly 160, dough delivery mechanism 120, and/or other portion of the dough depositing machine 100 (e.g., conveyor 150, etc.) may be variably controlled. Moreover, the speed of the dough delivery mechanism 120 and the cutting assembly 160 may be independently controlled by the same controller or by separately provided controllers. Accordingly, the speed of the dough moving through the hopper 110 and out the forming dies 132 mounted on the head may be synchronized with the cutting assembly 160 and attuned to each particular dough composition. In this regard, the segments of dough could be deposited with proper spacing on baking sheet 140 located below the head. It will be understood that for different dough compositions, the speed of the various portions of the dough depositing machine 100 may be varied to achieve the desired spacing and size of the dough portions. Thus, the speed of operation of the machine 100 may, at least in part, be based on the properties of the dough being processed by the machine.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in retrofitting a dough depositing machine for processing non-traditional dough, the method comprising:
   providing a conventional dough depositing machine including:
      a hopper for receiving a supply of dough,
      a forming portion for shaping the dough into a predetermined shape, the forming portion comprising a die including at least one dough transfer port through which the dough is extrudable to form the dough into the predetermined shape,
      a dough delivery mechanism including at least one roller assembly for driving the dough between the hopper and the forming portion, wherein the at least one roller assembly is mounted by a bearing supported in a bearing housing,
      a cutting assembly for cutting a portion of the dough to separate the portion of the dough from the forming portion, and
      a controller for controlling the dough depositing machine; and
   retrofitting at least one of the forming portion, dough delivery mechanism, or the cutting assembly so as to be operable to process the non-traditional dough comprising at least one of a gluten-free, wheat-free, dairy-free, egg-free, vegetarian, or vegan dough using the dough depositing machine, the retrofitting comprising:
      replacing the bearing housing with a separable bearing housing comprising a first portion and a second portion, wherein the first portion is selectively separable from the second portion and the separable bearing housing comprises replaceable bearing inserts supported by the separable bearing housing and defining bearing surfaces thereon,
      replacing the die of a conventional dough depositing machine with a modified die including a plurality of modified dough transfer ports having a cross sectional area larger than a cross sectional area of dough transfer ports of the conventional dough depositing machine, wherein the respective dough modified transfer port comprises the cross sectional area of the respective modified dough transfer port not smaller than about 0.75 in$^2$ and the respective modified dough transfer port comprises a diameter of at least about 1 inch (2.5 cm),
      replacing the cutting assembly with a modified cutting assembly comprising a reinforced cutting assembly frame and a mechanical mount for mounting the frame to a drive shaft to withstand a torque acting on the frame associated with cutting the non-traditional dough, the drive shaft comprising a surface treatment to assist in withstanding rotational movement of the frame with respect to the drive shaft, and wherein the modified cutting assembly comprises a wire for cutting through said non-traditional dough, and
      modifying the controller to include a first drive system for controlling the dough delivery mechanism and a second drive system for driving the cutting assembly to separate the dough from the forming portion, wherein the retrofitting includes modifying the controller to be operable to control at least one of the first drive system or the second drive system based at least partially on varying dough compositions, wherein the controller is operable to control the first drive system and the second drive system independently.

2. The method according to claim 1, wherein the separable bearing housing includes the replaceable bearing inserts defining bearing surfaces thereon.

3. The method according to claim 2, wherein the replaceable bearing inserts include a key engageable by a keyway in a portion of the separable bearing housing to secure the bearing insert with respect to the separable bearing housing.

4. The method according to claim 2, wherein the replaceable bearing inserts comprise a bearing contact surface area not smaller than about 5.5 in$^2$.

5. The method according to claim 1, wherein the respective modified dough transfer port comprises a cross sectional area at least about 50% larger than a cross sectional area of the respective dough transfer port of the conventional dough depositing machine.

6. The method according to claim 1, wherein the cutting assembly frame is adapted for replaceably receiving a plurality of cutting wires such that a wire size and configuration can be selected based on the non-traditional dough for improved performance with respect to varying dough compositions.

7. A method for operation of a dough depositor with non-traditional dough, the method comprising:
   receiving a supply of non-traditional dough in a hopper;
   supplying the non-traditional dough to a forming portion by operation of at least one roller supported by a bearing insert supportably positioned with respect to a separable bearing housing;
   forming the non-traditional dough into a predetermined shape by passing the non-traditional dough through a dough transfer port sized based at least partially on properties of the non-traditional dough, wherein the dough transfer port comprises a cross sectional area not less than about 0.75 in² and a diameter of at least about 1 inch (2.5 cm);

cutting a portion of the non-traditional dough in the predetermined shape with a cutting assembly, wherein the cutting includes passing a cutting wire, having at least one of a configuration or size selected based at least partially on the properties of the non-traditional dough through, the non-traditional dough, wherein the cutting wire is supported by a frame mounted to a driveshaft and the frame comprises a reinforced mounting structure to resist movement of the frame with respect to the driveshaft during the cutting, and wherein the driveshaft comprises a surface treatment that inhibits movement of the frame with respect to the driveshaft during the cutting; and controlling a first drive system for controlling the supplying, wherein the controller is operable to control the first drive system to vary a first speed of the first drive system at which the dough is supplied to the forming portion; and controlling a second drive system for controlling the cutting, wherein the controller is operable to control a second speed of the second drive system; and wherein the controller is operable to operate the first drive and the second drive independently, and wherein the first drive system acts on the dough prior to the second drive system;

wherein the first and the second speed of at least the supplying and cutting steps are based on the properties of the non-traditional dough.

* * * * *